United States Patent
Nakanishi et al.

(10) Patent No.: US 11,212,836 B2
(45) Date of Patent: Dec. 28, 2021

(54) METHOD OF STARTING TRANSMISSION OF DSC MESSAGE, STORAGE MEDIUM STORING DSC MESSAGE TRANSMISSION PROGRAM, AND COMMUNICATION DEVICE

(71) Applicant: ICOM INCORPORATED, Osaka (JP)

(72) Inventors: Takaji Nakanishi, Osaka (JP); Yukihiro Tokuyama, Osaka (JP); Yasuhiro Nishiguchi, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 17/075,982

(22) Filed: Oct. 21, 2020

(65) Prior Publication Data

US 2021/0153251 A1 May 20, 2021

(30) Foreign Application Priority Data

Nov. 14, 2019 (JP) .............................. JP2019-206008

(51) Int. Cl.
*H04W 74/08* (2009.01)
*H04B 1/00* (2006.01)
*H04B 1/44* (2006.01)

(52) U.S. Cl.
CPC ...... *H04W 74/0808* (2013.01); *H04B 1/0007* (2013.01); *H04B 1/44* (2013.01)

(58) Field of Classification Search
CPC .... H04W 74/0808; H04B 1/0007; H04B 1/44
See application file for complete search history.

(56) References Cited

U.S. PATENT DOCUMENTS

| | | | | |
|---|---|---|---|---|
| 4,547,778 A | * | 10/1985 | Hinkle | G01S 1/685 340/539.1 |
| 5,991,364 A | * | 11/1999 | McAllister | H04M 3/42204 379/229 |
| 6,252,949 B1 | * | 6/2001 | Chishaki | H04M 1/2749 379/100.14 |
| 7,305,243 B1 | * | 12/2007 | Tendler | H04M 3/493 455/404.2 |
| 7,366,467 B2 | * | 4/2008 | Takikita | H04W 72/0446 370/337 |
| 8,369,967 B2 | * | 2/2013 | Hoffberg | G06F 3/048 700/80 |
| 10,127,556 B2 | * | 11/2018 | Lesesky | G07C 5/085 |

FOREIGN PATENT DOCUMENTS

JP H03-038782 B2 6/1991

* cited by examiner

*Primary Examiner* — Harry H Kim
(74) *Attorney, Agent, or Firm* — Muncy, Geissler, Olds & Lowe, P.C.

(57) ABSTRACT

Provided is a method for, upon transmission of a DSC message being instructed, enabling quick start of the transmission. The method includes; (1) instructing, upon transmission of the DSC message being instructed, an antenna tuner to start tuning regardless of whether being busy or not, and switching an antenna from reception to transmission after the tuning is completed, (2) performing busy check, and standing by for a time period defined in the standard, when a reception signal in a transmission channel is no longer a dot pattern, and executing these processes (1) and (2) in parallel.

16 Claims, 6 Drawing Sheets

METHOD OF STARTING TRANSMISSION OF DSC MESSAGE, STORAGE MEDIUM STORING DSC MESSAGE TRANSMISSION PROGRAM, AND COMMUNICATION DEVICE

TECHNICAL FIELD

The present invention relates to a method of starting transmission of a DSC (Digital Selective Calling) message with which, when transmission of the DSC message is instructed, transmission can be quickly started, a DSC message transmission program, and a communication device.

BACKGROUND ART

When a DSC message is to be transmitted, a busy check (operation for confirming that a wireless communication device of another ship is not transmitting a DSC message) needs to be performed in order to prevent interference. For example, Japanese Examined Patent Application Publication No. H03-038782B discloses a technique in which a radio generates digital data by demodulating, using an FM demodulation IC, a reception signal of a channel that is selected for transmission, and if the digital data includes a predetermined frame synchronization code, and this frame synchronization code can be periodically received, this selected channel is determined to be busy. Also, impedance matching with an antenna needs to be achieved in accordance with the transmission frequency of the DSC message.

In known communication devices, a plurality of processes such as a busy check and antenna tuning that are needed before transmitting a DSC message are sequentially processed, and therefore it takes a long period of time before starting transmission of the DSC message.

Also, the DSC message is started with, after a dot pattern, a series of symbols in units of 10 bits such as "DX". Known communication devices judge, in units of 10 bits, whether or not the reception signal is a target symbol, and therefore cannot determine whether or not the reception signal is the target symbol until having received one symbol's worth signal (10 bits).

Also, in order to confirm whether or not a transmission signal from a wireless communication device of another ship is present, S-meter squelch is used in a known technique, however, in order to detect a transmission signal using the S-meter squelch, the signal intensity needs to be larger than a noise level, and therefore if the transmission signal is small, an accurate busy check is not possible.

Therefore, the present invention aims to provide a technique in which when transmission of a DSC message is instructed, transmission thereof can be quickly started.

SUMMARY OF INVENTION

With a method of starting transmission of a DSC message of the present invention, a communication device executes the following procedures when starting transmission of the DSC message.
(1) Executing, upon transmission of the DSC message being instructed, regardless of whether being busy or not, communication for instructing an antenna tuner to start tuning (process C), reception of a signal indicating tuning completion from the antenna tuner (process D), and switching of an antenna from reception to transmission (process E).
(2) Executing, when a binary signal obtained by binarizing a signal received at the transmission frequency of the DSC message is no longer a dot pattern in which "1" and "0" alternate every bit, a busy check for determining whether or not a DSC message is received from another communication device at a transmission frequency of the DSC message (process A), and a standby of a predetermined time in order to avoid collision with another communication (process B).
(3) Starting transmission of the DSC message after both of the procedures (1) and (2) are ended.

A DSC message transmission program stored in a storage medium of the present invention causes a control unit of a communication device including: a DSC reception unit that continuously monitors reception of a DSC message from another communication device; a transmission unit that transmits the DSC message and a voice signal; a reception unit that receives the voice signal; an antenna switch that switches the connection destination of an antenna between the transmission unit and the reception unit; and an interface to which an antenna tuner that tunes the antenna is connected, to function as the following first to third means.

(First means) For instructing, upon transmission of the DSC message being instructed, the antenna tuner to start tuning regardless of whether being busy or not (process C), and after receiving a signal indicating tuning completion from the antenna tuner (process D), switching the connection destination of the antenna from the reception unit to the transmission unit (process E).

(Second means) For executing a busy check for judging whether being busy or not when a binary signal obtained by binarizing a signal received at the transmission frequency of the DSC message is no longer a dot pattern in which "1" and "0" alternate every bit (process A), and a standby of a predetermined time in order to avoid collision with another communication (process B).

(Third means) For starting transmission of the DSC message after the processes performed by the first means and the second means are both ended.

A communication device of the present invention includes: a DSC reception unit that continuously monitors reception of a DSC message from another communication device; a transmission unit that transmits the DSC message and a voice signal; a reception unit that receives the voice signal; an antenna switch that switches the connection destination of an antenna between the transmission unit and the reception unit; an interface to which an antenna tuner that tunes the antenna is connected; a storage medium storing the DSC message transmission program described above; and a control unit that reads out a program from this storage medium and executes the program.

Advantageous Effect of Invention

According to the present invention, when transmission of a DSC message is instructed, transmission thereof can be quickly started.

DETAILED DESCRIPTION OF THE EMBODIMENT

Figure 1:
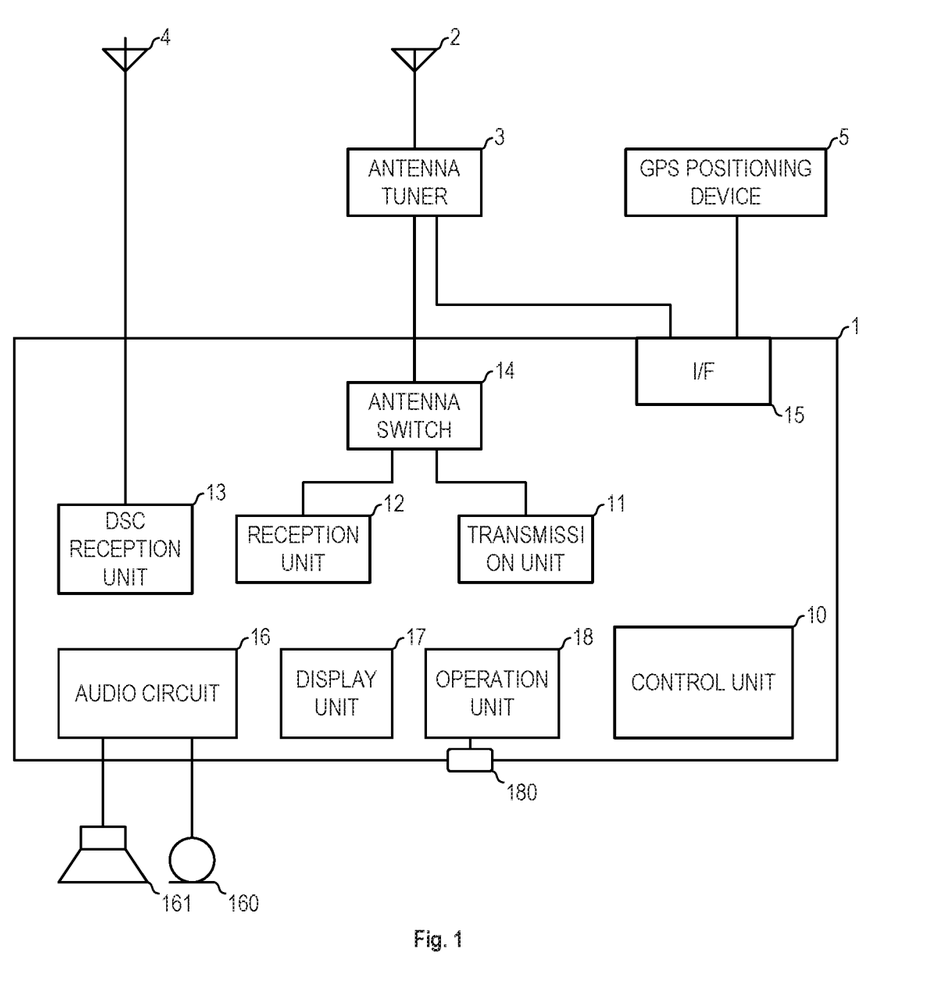
FIG. 1 is a block diagram of a communication device, which is an embodiment of the present invention.

FIG. 1 is a block diagram of a communication device, which is an embodiment of the present invention. The communication device 1 of the embodiment is a transceiver to be installed in vessels. The communication device 1 includes a control unit 10, a transmission unit 11, a reception unit 12, a DSC reception unit 13, an antenna switch 14, and an interface 15. The transmission unit 11 and the reception unit 12 are communication circuits that perform digital voice communication at HF frequencies. The DSC reception unit 13 is a reception circuit that continuously monitors whether or not a DSC (Digital Selective Calling) message (hereinafter, DSC message) is transmitted from communication devices of other ships.

The DSC reception unit 13 continuously receives a signal at 2187.5 kHz (DSC dedicated channel), which is a DSC frequency in Japan, for example. The radio wave format of the DSC message is F1B, and the bit rate is 100 bps. F1B is a narrow band FSK (frequency shift keying), and the signal to be transmitted with F1B is a signal representing two values, namely a mark "1" and a space "0", using two frequencies. A signal at a frequency on a lower side indicates a mark (1), and a signal at a frequency on a higher side indicates a space (0). The DSC reception unit 13 binarizes the reception signal in a compulsory manner without detecting the above two frequencies from the reception signal. That is, the DSC reception unit 13 compares between reception levels (voltages) on higher and lower frequency sides relative to the central frequency (transmission frequency of the DSC message) of the DCS communication, and determines that a value corresponding to the larger voltage has been received. That is, the DSC reception unit 13 determines that a mark (1) has been received if the voltage on a lower frequency side is larger, and a space (0) has been received if the voltage on a higher frequency side is larger. With this demodulation method, even if a DSC message is embedded in noise, the DSC reception unit 13 can demodulate a signal if a minute voltage difference due to the DSC message signal is present. Note that even in a case where a signal is not present and only noise is being received, the DSC reception unit 13 compares between reception levels on higher and lower frequency sides relative to the central frequency, and outputs some kind of binary signal. The DSC reception unit 13 performs the above-described demodulation processing at 100 bps, and inputs a binary signal (bit series) generated by the demodulation processing to the control unit 10. The control unit 10 determines whether or not a DSC message is being received from a communication device of another ship by decoding the received binary signal.

A dedicated antenna 4 is connected to the DSC reception unit 13. An antenna 2 is connected to the transmission unit 11 and the reception unit 12 via the antenna switch 14 and an antenna tuner 3. The antenna switch 14 switches the connection destination of the antenna 2 between the transmission unit 11 and the reception unit 12 in accordance with an instruction from the control unit 10.

The antenna tuner 3 is a circuit for achieving impedance matching between the transmission unit 11 side and the antenna 2 side in accordance with the transmission frequency. The control unit 10 transmits a tuning start signal to the antenna tuner 3 via the interface 15, switches the antenna switch 14 to the transmission unit 11 side, and furthermore causes the transmission unit 11 to output a weak carrier at a transmission frequency. The antenna tuner 3 achieves the impedance matching by minimizing the reflected wave of this carrier. The antenna tuner 3, upon completing the impedance matching, transmits an adjustment complete signal to the control unit 10. The control unit 10, upon receiving the adjustment complete signal, again switches the antenna switch 14 to the reception unit 12 side. This series of processing is the antenna tuning processing.

The communication device 1 further includes an audio circuit 16, a display unit 17, and an operation unit 18. The audio circuit 16 processes voice signals that are transmitted from the transmission unit 11 and received by the reception unit 12. A microphone 160 and a speaker 161 are connected to the audio circuit 16. When voice communication with another radio is performed, the audio circuit 16 inputs a voice signal received from the microphone 160 to the transmission unit 11, and outputs a voice signal received by the reception unit 12 to the speaker 161. The speaker 161 may be an internal speaker. The display unit 17 includes a liquid crystal screen, and displays various types of information. The operation unit 18 includes various types of operation buttons including a DISTRESS button 180. The operation unit 18, upon any of these operation buttons being operated (pressed), inputs an operation signal corresponding to the operated operation button to the control unit 10. When a user presses the DISTRESS button 180, and its operation signal is input to the control unit 10, the control unit 10 starts processing for transmitting a DSC message. In the following, the operations of the communication device 1 when the DISTRESS button 180 has been pressed will be described.

Figure 2:
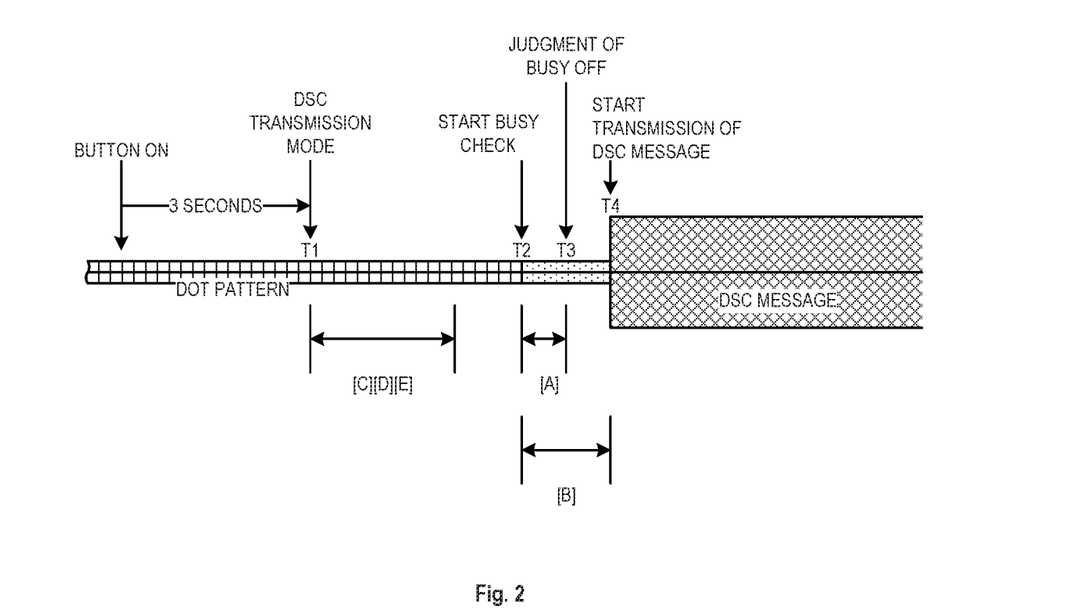
FIG. 2 is a diagram illustrating procedures until the communication device starts transmission of a DSC message.
Figure 3:
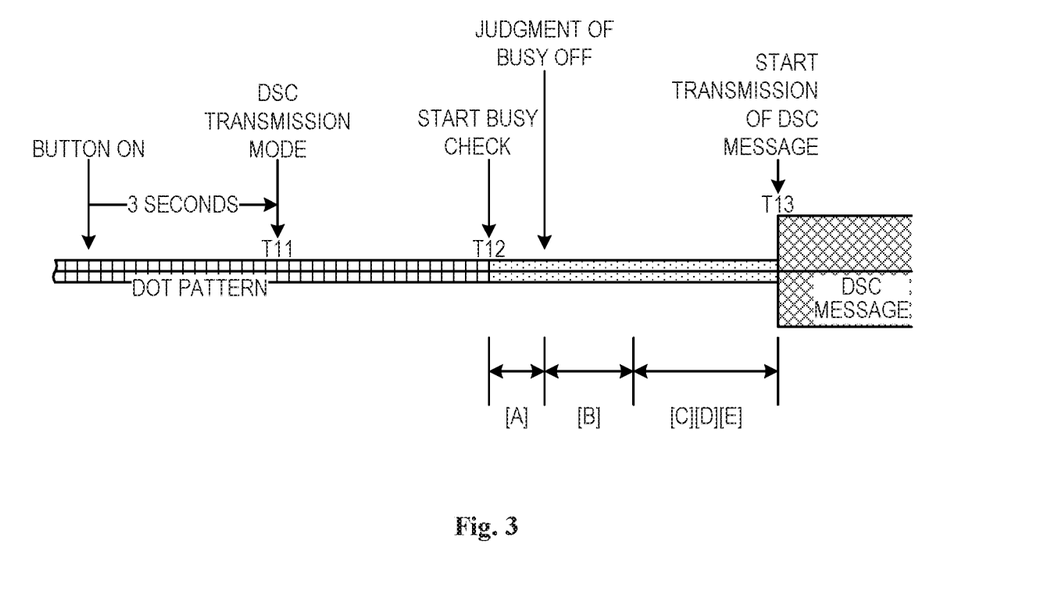
FIG. 3 is a diagram illustrating procedures until a known communication device starts transmission of a DSC message.

FIG. 2 is a time chart until, when the DISTRESS button 180 has been pressed, the communication device 1 starts transmission of a DSC message (hereinafter, simply "DSC transmission"). FIG. 3, which is shown for comparison, is a time chart until a known communication device starts the DSC transmission.

When performing the DSC transmission, the user needs to continuously press the DISTRESS button 180 for three seconds. This is to avoid a DSC distress message from being transmitted due to the DISTRESS button 180 having been erroneously pressed. Upon the DISTRESS button 180 being continuously pressed for three seconds, the communication device 1 enters a DSC transmission mode, and starts the DSC transmission after performing the following processes.

[Process A] Busy check (about 240 milliseconds)

Processing for judging whether a communication device of another ship has started transmission of a DSC message.

[Process B] Standby (about 460 milliseconds)

A standby time for collision avoidance that is required in the telecommunications standard.

For example, in a case of Distress (non alert), a standby in a period of "fixed time (100 milliseconds)+random time (0 to 100 milliseconds)" is required.

[Process C] Tuning start instruction (about 340 milliseconds)

Starting antenna tuning processing including communication for instructing the antenna tuner 3 to start tuning.

[Process D] Antenna tuning (about 450 milliseconds)

Tuning performed by the antenna tuner 3. A standby time for the control unit 10 until receiving a tuning completion signal from the antenna tuner 3.

[Process E] Antenna switching (about 100 milliseconds)

Switching from reception to transmission in order to perform transmission at full power.

The DSC message is transmitted in conformity to the ETSI (European Telecommunications Standards Institute) EN 300 338-2 standard. The DSC message includes a message body that is to be transmitted subsequent to a phasing sequence (including a dot pattern). The phasing sequence is constituted by a 200-bit dot pattern (pattern in which "1" and "0" alternate every bit) and a DX symbol and a RX symbol that are repeated six times. The control unit 10 judges, in the busy check in Process A, whether or not a binary signal received from the DSC reception unit 13 is the DX symbol and the RX symbol.

The example in FIG. 2 illustrates a case where, when the communication device 1 enters the DSC transmission mode (T1), the binary signal input to the control unit 10 from the DSC reception unit 13 is a dot pattern. The dot pattern in which "1" and "0" alternate every bit is a pattern that frequently appears even in a case where noise, which does not include a signal, is binarized. The control unit 10 determines to be busy while receiving a dot pattern and holds the transmission of the DSC message. On the other hand, the control unit 10, upon entering the DSC transmission mode, executes processes C to E even if it is determined to be busy. As described above, the processes C to E are the process for instructing the antenna tuner 3 to start tuning, the process for waiting until receiving a tuning completion signal from the antenna tuner 3, and the process for switching the antenna switch 14 from the reception unit 12 side to the transmission unit 11 side. A period of about 890 milliseconds is needed for executing these processes.

When the binary signal received from the DSC reception unit 13 is no longer a dot pattern (T2), that is, when two bits of bit 1 (or bit 0) are successively received, the control unit 10 starts the busy check (Process A). The details of the busy check will be described with reference to FIG. 5. In the busy check, if it is judges that the binary signal being received is neither the DX symbol nor the RX symbol, the control unit 10 ends the busy check at this point in time (T3). The control unit 10 performs the standby in process B that is assumed to have started at time T2 at which the busy check has started. After completing the process B, the communication device 1 starts transmission of the DSC message (T4). Accordingly, the control unit 10 can start transmission of the DSC message after completing the busy check with only a short period of standby, which is a period between times T4 and T3.

In this way, in the communication device 1 of the embodiment, the processes C to E, which are processes regarding the antenna 2, are separately executed in parallel to the judgment of the binary signal received from the DSC reception unit 13, and therefore the time needed for the entire processing is reduced. Moreover, if "BUSY OFF" is judged, the control unit 10 measures the standby time from time T2 at which the busy check was started, and therefore the time needed for the busy check can be included in the standby time.

FIG. 3 is a time chart of a known procedure, which is shown as a reference. The control unit 10, upon entering a DSC transmission mode (T11), waits until the dot pattern is ended (T12), sequentially performs processes from the busy check (process A) to the antenna switching (process E), and thereafter starts transmission of a DSC message (T13). Therefore, it takes about 1590 milliseconds until starting transmission of the DSC message (T13) from the start of the busy check.

Figure 4:
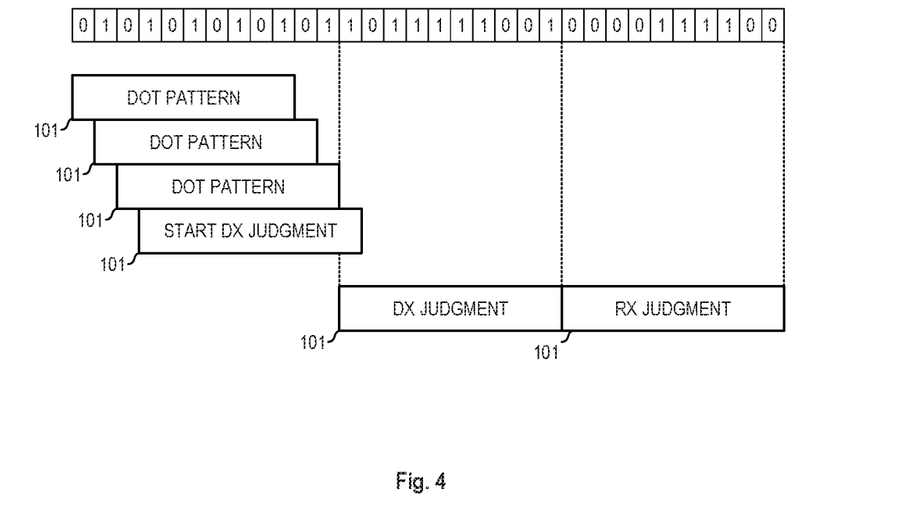
FIG. 4 is a diagram illustrating a decoding method of a DSC message in a normal time.
Figure 5:
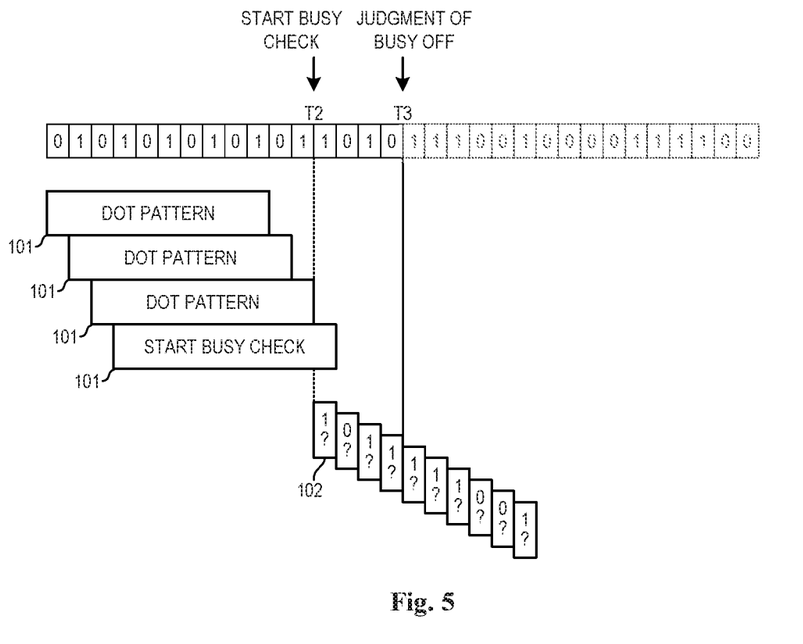
FIG. 5 is a diagram illustrating a busy check method in a DSC transmission mode.

FIGS. 4 and 5 are time charts illustrating methods of decoding a binary signal and the busy check that are performed by the control unit 10. FIG. 4 illustrates a method in a normal time (not in the DSC transmission mode). The normal time refers to a period of not being in the DSC transmission mode, and the busy check is not executed. FIG. 5 illustrates a method in the DSC transmission mode, and the busy check is executed. This busy check corresponds to the process A in FIG. 2.

In FIG. 4, the control unit 10 sets a virtual 10-bit shift register 101, and successively inputs the binary signals received from the DSC reception unit 13 to the shift register 101. The control unit 10 judges whether the 10-bit binary signal input to the shift register 101 is a dot pattern or some symbol. While the input binary signal is judged to be a dot pattern, the control unit 10 judges whether or not the 10 bits in the shift register 101 is a dot pattern every time 1 bit is shifted. This is for the control unit 10 to quickly detect the end timing of the dot pattern. The end of the dot pattern is the timing at which the bit series of the binary signals is no longer a bitwise alternating pattern of 1 and 0, and two bits of the same value (1 or 0) continues. When the dot pattern is ended, the control unit 10 judges the bit sequence for each 10 bits starting from the bit (second bit of the successive two bits of the same value) at which the dot pattern is ended, and decodes the symbol. Note that FIG. 4 shows an example in which after the dot pattern, the correct DX symbol and RX symbol are received from the DSC reception unit 13.

In FIG. 5, even in the DSC transmission mode, in a period during which a dot pattern continues, the control unit 10 judges whether the input binary signals are in a dot pattern, every time one bit is shifted using the shift register 101, similarly to the normal time. When a dot pattern is ended, that is, when 1 (or 0) continues for two bits, the control unit 10 judges whether the 10 bits starting from the bit at which the dot pattern is ended is a symbol meaning DX by performing judgment bit by bit. That is, the control unit 10 judges whether the 10 bits starting from the bit at which the dot pattern is ended are respectively "1", "0", "1", "1", "1", "1", "1", "0", "0", and "1".

In the example in FIG. 5, the first bit (bit at which the dot pattern is ended) is 1, and the judgment by the control unit 10 is "affirmative". The subsequent second and third bits are respectively 0 and 1, and the judgment by the control unit 10 is "affirmative". However, the fourth bit is 0, which should be 1, and the judgment by the control unit 10 is "negative". If the judgment is "negative", the control unit 10 judges that a DSC message is not being received, ends the busy check, and judged to be "BUSY OFF".

If the dot pattern is ended due to two bits being successively 0, the bit at which the dot pattern is ended is 0, it is not possible that the symbol starting from this bit is DX, and therefore, the control unit 10 judged to be "BUSY OFF" at this point in time.

Figure 6:
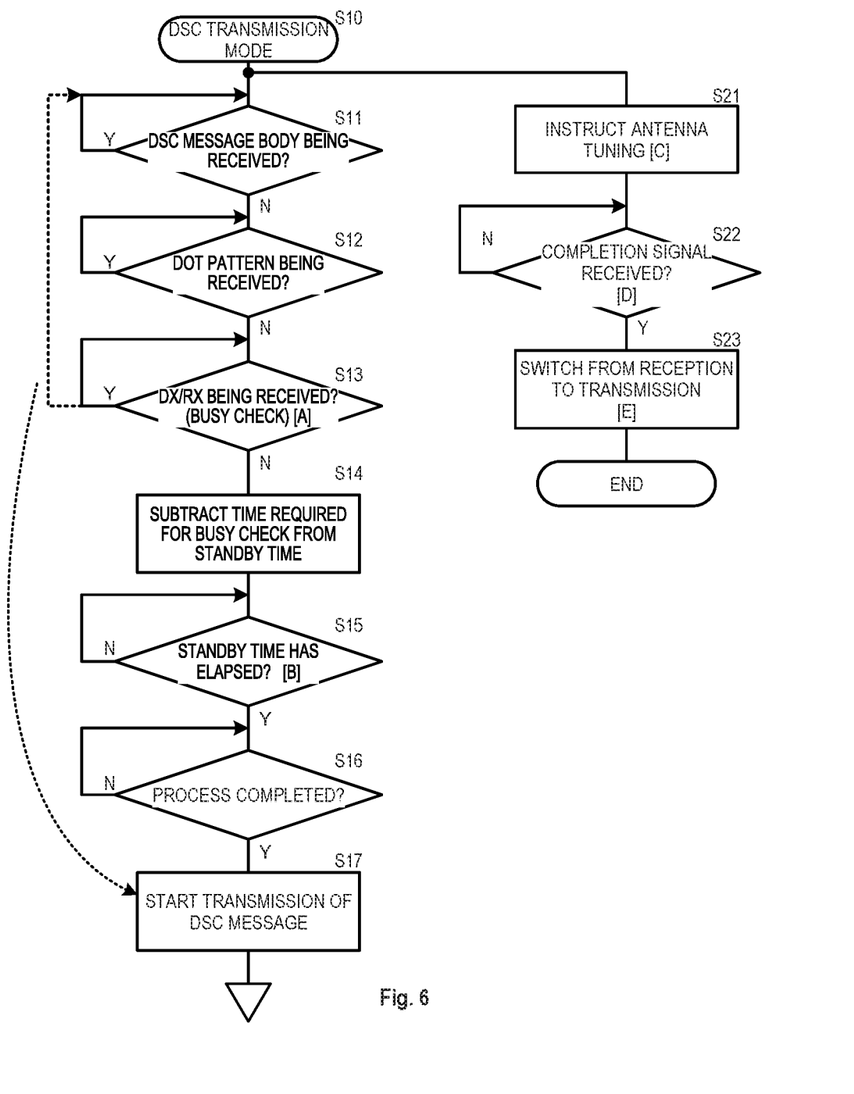
FIG. 6 is a flowchart illustrating operations of a control unit of the communication device.

FIG. 6 is a flowchart illustrating operations of the control unit 10 when the DISTRESS button 180 is pressed by the user for 3 seconds, and the communication device 1 enters the DSC transmission mode. When the communication device 1 enters the DSC transmission mode, the control unit 10 performs tuning of the antenna 2 (steps S21 to S23) in parallel to the processing (steps S11 to S13) for checking the binary signals received from the DSC reception unit 13.

In step S21, the control unit 10 outputs a signal for instructing the antenna tuner 3 to tune the antenna 2 (step S21). In parallel thereto, the control unit 10 instructs the transmission unit 11 to output, with weak power, a carrier at a transmission frequency of the DSC message. The antenna tuner 3 adjusts the impedance so as to be optimum at the frequency of the received carrier, and outputs an adjustment complete signal to the control unit 10. The control unit 10 stands by in step S22 until receiving the adjustment complete signal from the antenna tuner 3. Upon receiving the adjustment complete signal from the antenna tuner 3 (YES in step S22), the control unit 10 switches the antenna switch 14 such that the transmission unit 11 can perform transmission at full power (step S23).

Meanwhile, in steps S11 to S13, the control unit 10 checks the binary signals received from the DSC reception unit 13. In step S11, the control unit 10 determines whether a DSC message body is being received from the communication device of another ship (step S11). If it is determined that a DSC message body is being received (YES in step S11), the control unit 10 stands by until the reception of the DSC message is ended.

If it is determined that a DSC message body is not being received (NO in step S11), the control unit 10 determines whether the binary signals being received from the DSC reception unit 13 are in a dot pattern, that is, whether a dot pattern is being received (step S12). The judgment of the dot pattern may be performed using the method illustrated in FIG. 5. If it is determined that a dot pattern is being received (YES in step S12), the control unit 10 stands by until the dot pattern is ended. If the dot pattern is ended, or if it is determined that a dot pattern is not being received (NO in step S12), the control unit 10 executes the busy check in process A (step S13). That is, the control unit 10 judges whether the binary signals received from the DSC reception unit 13 match the DX or RX bit sequence by performing judgment bit by bit (refer to FIG. 5).

While it is determined that the binary signals received from the DSC reception unit 13 match the DX or RX bit sequence of the DSC message (YES in step S13), the control unit 10 stands by in step S13, and if a DSC message body is started, the control unit 10 returns the processing to step S11. If it is determined that the binary signals received from the DSC reception unit 13 differ from the DX or RX bit sequence (NO in step S13), the control unit 10 judges that a DSC message is not being received and is "BUSY OFF" (NO in step S13).

The control unit 10 subtracts the time required for the busy check in step S13 from the standby time of the process B (step S14), and stands by for a period of the subtracted standby time (step S15, process B). When the process B is ended (YES in step S15), the control unit 10 determines whether the process E that has been processed in parallel is ended (step S16), and if it is determined that the process E is ended (YES in step S16), starts transmission of the DSC message (step S17). If it is determined that the process E is not ended (NO in step S16), the control unit 10 stands by until the process E is ended, and thereafter starts transmission of the DSC message (step S17).

Note that, if 10 seconds or more has elapsed in the processing in steps S11 to S13, the control unit 10 starts transmission of the DSC message regardless of whether the transmission frequency is busy or not. It is because the transmission of the distress signal cannot be delayed any longer.

Note that, in the present embodiment, a high frequency (HF) communication device is described as an example, but the present invention can also be applied to a medium frequency (MF) or very high frequency (VHF) communication device.

In the present embodiment, if the antenna tuning is not needed or not possible, the processes D and E may be omitted.

The method of starting transmission of a DSC message described in "SUMMARY" can be appended with the following aspects, or can be modified as follows.

In a second procedure, if the fact of not being busy is judged in the process A, the communication device executes the process B only in a period from the timing at which the process A is started until a predetermined time has elapsed.

In the second procedure, the communication device performs judgment regarding whether or not a DSC message is received, in the process A, on a binary signal bit by bit.

In the second procedure, the reception signal is binarized in the processing in which voltages of the reception signal on a higher and lower frequency sides relative to the transmission frequency of the DSC message are compared, and a value corresponding to the larger voltage of the voltages is determined to have been received.

The DSC message transmission program described in "SUMMARY" can be appended with the following aspects, or can be modified as follows.

In a second means, if the fact of not being busy is judged in the process A, the control unit executes the process B only in a period from the timing at which the process A is started until a predetermined time has elapsed.

In the second means, the communication device performs judgment regarding whether or not a DSC message is received, in the process A, on a binary signal bit by bit.

In the second means, the reception signal is binarized in the processing in which voltages of the reception signal on a higher and lower frequency sides relative to the transmission frequency of the DSC message are compared, and a value corresponding to the larger voltage of the voltages is determined to have been received.

The communication device described in "SUMMARY" may transmit the DSC message at an HF frequency.

REFERENCE NUMERALS 1 communication device (transceiver)
3 antenna tuner
10 control unit
11 transmission unit
13 DSC reception unit
14 antenna switch
101 shift register
180 DISTRESS button

What is claimed is:
1. A method of starting transmission of a Digital Selective Calling (DSC) message,
when a communication device executes, at a time of starting transmission of the DSC message,
process A: a busy check for determining whether or not a DSC message is received (hereinafter, busy) from another communication device at a transmission frequency of the DSC message,
process B: a standby for a predetermined time in order to avoid collision with another communication,
process C: communication for instructing an antenna tuner to start tuning,
process D: reception of a signal indicating tuning completion from the antenna tuner, and process E: switching of an antenna from reception to transmission, the method comprising:
(1) executing processes C, D and E upon transmission of the DSC message being instructed, regardless of whether being busy or not;
(2) executing processes A and B when a binary signal obtained by binarizing a signal received at the transmission frequency of the DSC message is no longer a dot pattern in which "1" and "0" alternate every bit; and
(3) starting transmission of the DSC message after both of the procedures (1) and (2) are ended.

2. The method of starting transmission according to claim 1, wherein, in the procedure (2), if a fact of being not busy is judged in the process A, the process B is executed in a period from the timing at which the process A is started until the predetermined time has elapsed.

3. The method of starting transmission according to claim 1, wherein, in the procedure (2), the judgment of whether or not the DSC message has been received in the process A is performed on the binary signal bit by bit.

4. The method of starting transmission according to claim 2, wherein, in the procedure (2), the judgment of whether or not the DSC message has been received in the process A is performed on the binary signal bit by bit.

5. The method of starting transmission according to claim 1, wherein, in the procedure (2), the processing for binarizing a signal received at the transmission frequency of the DSC message includes comparing voltages of the reception signal on a higher and lower frequency sides relative to the transmission frequency of the DSC message, and determining that a value corresponding to the larger voltage of the voltages has been received.

6. The method of starting transmission according to claim 2, wherein, in the procedure (2), the processing for binarizing a signal received at the transmission frequency of the DSC message includes comparing voltages of the reception signal on a higher and lower frequency sides relative to the transmission frequency of the DSC message, and determining that a value corresponding to the larger voltage of the voltages has been received.

7. The method of starting transmission according to claim 3, wherein, in the procedure (2), the processing for binarizing a signal received at the transmission frequency of the DSC message includes comparing voltages of the reception signal on a higher and lower frequency sides relative to the transmission frequency of the DSC message, and determining that a value corresponding to the larger voltage of the voltages has been received.

8. A non-transitory storage medium storing a Digital Selective Calling (DSC) message transmission program for causing a control unit of a communication device including:
a DSC reception unit that continuously monitors reception of a DSC message from another communication device;
a transmission circuitry that transmits the DSC message and a voice signal;
a reception circuitry that receives the voice signal;
an antenna switch that switches the connection destination of an antenna between the transmission circuitry and the reception circuitry; and
an interface to which an antenna tuner that tunes the antenna is connected, to function as;
upon transmission of the DSC message being instructed, instructing the antenna tuner to start tuning regardless of whether or not a DSC message is received (hereinafter, busy) from another communication device at a transmission frequency of the DSC message (process C), and after receiving a signal indicating tuning completion from the antenna tuner (process D), switching the connection destination of the antenna from the reception unit to the transmission unit (process E);
executing a busy check for judging whether being busy or not when a binary signal obtained by binarizing a signal received at the transmission frequency of the DSC message is no longer a dot pattern in which "1" and "0" alternate every bit (process A), and standing by for a predetermined time in order to avoid collision with another communication (process B); and
starting transmission of the DSC message after the processes A through E are ended.

9. The storage medium storing the DSC message transmission program according to claim 8, wherein, in the second means, if a fact of being not busy is judged in the process A, the process B is executed in a period from the timing at which the process A is started until the predetermined time has elapsed.

10. The storage medium storing the DSC message transmission program according to claim 8, wherein, in the second means, the judgment of whether or not the DSC message has been received in the process A is performed on the binary signal bit by bit.

11. The storage medium storing the DSC message transmission program according to claim 9, wherein, in the second means, the judgment of whether or not the DSC message has been received in the process A is performed on the binary signal bit by bit.

12. The storage medium storing the DSC message transmission program according to claim 8, wherein, in the second means, the processing for binarizing a signal received at the transmission frequency of the DSC message includes comparing voltages of the reception signal on a higher and lower frequency sides relative to the transmission frequency of the DSC message, and determining that a value corresponding to the larger voltage of the voltages has been received.

13. The storage medium storing the DSC message transmission program according to claim 9, wherein, in the second means, the processing for binarizing a signal received at the transmission frequency of the DSC message includes comparing voltages of the reception signal on a higher and lower frequency sides relative to the transmission frequency of the DSC message, and determining that a value corresponding to the larger voltage of the voltages has been received.

14. The storage medium storing a DSC message transmission program according to claim 10, wherein, in the second means, the processing for binarizing a signal received at the transmission frequency of the DSC message includes comparing voltages of the reception signal on a higher and lower frequency sides relative to the transmission frequency of the DSC message, and determining that a value corresponding to the larger voltage of the voltages has been received.

15. A communication device comprising:
a Digital Selective Calling (DSC) reception unit that continuously monitors reception of a DSC message from another communication device;
a transmission unit that transmits the DSC message and a voice signal;
a reception unit that receives the voice signal;

an antenna switch that switches the connection destination of an antenna between the transmission unit and the reception unit;

an interface to which an antenna tuner that tunes the antenna is connected;

a non-transitory storage medium storing a DSC message transmission program; and a control unit that executes the DSC message transmission program stored in the non-transitory storage medium, wherein the DSC message transmission program causes the control unit to function as, upon transmission of the DSC message being instructed, instructing the antenna tuner to start tuning regardless of whether or not a DSC message is received (hereinafter, busy) from another communication device at a transmission frequency of the DSC message (process C), and after receiving a signal indicating tuning completion from the antenna tuner (process D), switching the connection destination of the antenna from the reception unit to the transmission unit (process E);

executing a busy check for judging whether being busy or not when a binary signal obtained by binarizing a signal received at the transmission frequency of the DSC message is no longer a dot pattern in which "1" and "0" alternate every bit (process A), and standing by for a predetermined time in order to avoid collision with another communication (process B); and starting transmission of the DSC message after the processes A through E are ended.

16. The communication device according to claim 15, wherein the transmission frequency of the DSC message is an HF frequency.

* * * * *